United States Patent Office 3,499,861
Patented Mar. 10, 1970

3,499,861
ROOM TEMPERATURE CURING RESIN AND FOUNDRY SAND COMPOSITION CONTAINING SAME
Francis M. Kujawa, Tonawanda, and Jonathan A. Stone, Lockport, N.Y., assignors to Hooker Chemical Corporation, Niagara Falls, N.Y., a corporation of New York
No Drawing. Filed May 19, 1967, Ser. No. 639,640
Int. Cl. C08g 22/14, 51/04
U.S. Cl. 260—25
24 Claims

ABSTRACT OF THE DISCLOSURE

Novel polyurethane compositions are provided by reacting an organic polyisocyanate with a resin mixture comprised of (1) a resin prepared by reacting (a) a condensation product of a phenol and an aldehyde or ketone containing condensate units having reactive phenolic hydroxyl groups, and (b) a substance reactive with the phenolic hydroxyl groups such as a mono oxirane ring compound, an alkylene halohydrin or an alkylene carbonate; and (2) a resinous product of the carbonization of pine wood, in the presence of (3) a solvent. The condensation product can also be prepared by first reacting the phenol with the substance reactive with the phenolic hydroxyl group, and thereafter condensing the modified phenol with an aldehyde or ketone. A foundry sand composition which is capable of being cured at room temperature is prepared by mixing foundry sand with the foregoing resin mixture, and thereafter reacting an organic polyisocyanate with the resin mixture to provide a polyurethane resin binder. The resulting foundry sand composition readily cures at room temperature.

BACKGROUND OF THE INVENTION

Resin binders for use in the production of foundry molds and cores are generally cured at high temperatures to achieve fast curing cycles required in foundries. However, the industry has been seeking resin binders that cure at low temperature, or even at room temperature, to avoid the necessity for high temperature curing operations which have higher energy requirements and often result in the production of obnoxious fumes.

Accordingly, it is an object of the invention to provide a resin binder for foundry sand that is capable of curing at low temperatures even at room temperatures, i.e., about 30 degrees centigrade. It is a further object of the invention to provide foundry sand binders that have a fast curing cycle at these low temperatures.

SUMMARY OF THE INVENTION

In accordance with the invention, there is provided a resinous composition which comprises:
(A) A component having the formula:

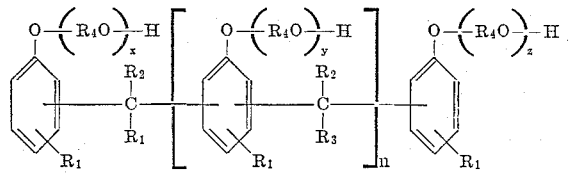

wherein
$n$ has an average value of about 0.2 to 6, preferably about 0.5 to 3;
$x$, $y$ and $z$ are integers from 1 to 25; preferably about 1 to 10;
$R_1$ is independently selected from the group consisting of hydrogen, fluorine, chlorine, bromine, and a hydrocarbon radical;
$R_2$ and $R_3$ are independently selected from the group consisting of hydrogen, a hydrocarbon radical, and a halogen-substituted hydrocarbon radical; and
$R_4$ is a hydrocarbon radical;

(B) A resinous product of the carbonization of pine wood; and
(C) A solvent.

Further, in accordance with the invention, the foregoing composition of components (A), (B) and (C) is reacted with an organic polyisocyanate to produce a polyurethane composition from which the solvent can be removed.

In accordance with the invention there is also provided a moldable composition comprised of foundry sand and a polyurethane product of the foregoing components (A) and (B) and an organic polyisocyanate.

The invention also provides for foundry molds and cores comprised of foundry sand that is consolidated with a cured polyurethane product of components comprising the foregoing components (A) and (B) and an organic polyisocyanate.

PREFERRED EMBODIMENTS OF THE INVENTION

The resin component (A) defined hereinabove by formula can be prepared by the process which comprises reacting together:
(a) A fusible, organic solvent soluble condensation product of a phenol and an aldehyde or ketone containing condensate units having reactive phenolic hydroxyl groups, and
(b) A substance reactive with the phenolic hydroxyl groups and selected from the group consisting of mono oxirane ring compounds, alkylene halohydrins, alkylene carbonates, and mixtures thereof. The condensation product can also be prepared by first reacting the phenol with the substance reactive with the phenolic hydroxyl group, and thereafter condensing the modified phenol with an aldehyde or ketone.

Fusible, organic solvent soluble condensation products of a phenol and an aldehyde or ketone suitable for use as starting materials in practicing the invention are well known to the art and can be prepared by well known methods. The phenol-aldehyde or phenol-ketone condensate should be soluble in organic solvents such as acetone and it should not be advanced to the insoluble "C" stage or resite stage. When the phenol is phenol itself and the aldehyde is formaldehyde, one type of condensation which is highly satisfactory contains condensation units which can be exemplified by the following formula:

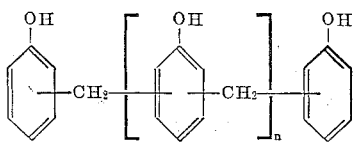

wherein $n$ has an average value of about 0.2 to 6, and often higher provided the resin is fusible and acetone or organic solvent-soluble. Preferably, the phenol-aldehyde condensate is a novolac, which contains more than one mole of phenol per mole of aldehyde or ketone.

Examples of phenols which can be used in preparing phenol-aldehyde condensates for use in practicing the invention include phenol itself or substituted phenols, wherein at least about half the substituted phenols have at least two of the ortho and para positions of the phenol nucleus available for condensation reaction (unsubstituted). Such phenols have the following general formula:

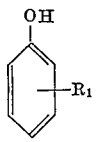

where $R_1$ can be H, F, Cl, Br or a suitable substituent selected from the following:

(a) Alkyl and alkenyl groups of one to eighteen carbon atoms in any of their isomeric forms and substituted on the phenolic nucleus in the ortho, meta or para positions;

(b) Alicyclic groups of five to eighteen carbon atoms such as cyclohexyl, cyclopentyl, methyl cyclohexyl, butylcyclohexyl, and the like;

(c) Aromatic or aralkyl groups of six to eighteen carbon atoms such as phenyl, alpha-methyl benzyl, benzyl, cumyl, and the like;

(d) Alkyl, alkenyl, alicyclic, aryl and aralkyl ketones wherein the hydrocarbon is defined hereinbefore;

(e) Alkyl, alkenyl, alicyclic, aryl and aralkyl carboxylic groups wherein the hydrocarbon is defined hereinbefore, and mixtures thereof. As indicated, the hydrocarbon radicals preferably have one to eighteen carbon atoms.

Suitable substituted phenols include the following: para-tertiary-butylphenol, para-chlorophenol, para-tertiary hexylphenol, para-isooctylphenol, para-phenylphenol, para - benzylphenol, para - cyclohexylphenol, para-octadecyl - phenol, para - nonylphenol, para - beta-naphthylphenol, para-alpha-naphthyl-phenol, cetyl-phenol, para-cumyl-phenol, para-hydroxy acetophenone, para-hydroxybenzophenone, a phenol alkylated with limonene, a phenol alkylated with oleic acid, as well as the corresponding ortho and meta derivatives such as meta-butyl phenol and ortho-butyl phenol, as well as mixtures thereof.

Aldehydes or ketones or mixtures thereof capable of reacting with a phenol are satisfactory, provided the aldehydes or ketones do not contain a functional group or structure which is detrimental to the condensation reaction or with oxyalkylation of the condensate. The preferred aldehyde is formaldehyde, which can be in aqueous solution or in any of its low polymeric forms such as paraform or trioxane. The aldehydes preferably contain one to eight carbon atoms. Other examples include acetaldehyde, propionaldehyde, butyraldehyde, benzaldehyde, furfural, 2-ethylhexanal, ethylbutyraldehyde, heptaldehyde, pentaerythrose, glyoxal, chloral, and the like. The ketones have the formula:

wherein $R_2$ and $R_3$ can be hydrogen or organic radicals. Examples of ketones are acetone, methyl ethyl ketone, diethyl ketone, methyl benzyl ketone, methyl cyclohexyl ketone, diallyl ketone, dichloromethyl ketone, as well as mixtures thereof. $R_2$ and $R_3$ preferably have 1 to 7 carbon atoms.

The ratio of aldehyde or ketone to the phenol (or oxyalkylated phenol) can be varied to prepare condensates of various molecular weights and viscosity of the final condensation product can be regulated by the molecular weight of the phenol-aldehyde or phenol-ketone condensate. Preferably, the amount of aldehyde or ketone varies from 0.5 to 1.0 mole per mole of the phenol (or oxyalkylated phenol) when a mono- or difunctional phenol is used. In instances where a trifunctional phenol is used, the preferred upper ratio of aldehyde or ketone is about 0.85 mole per mole of phenol (or oxyalkylated phenol). It is preferred that the aldehyde or ketone and phenol be reacted using an acid catalyst such as sulfuric, hydrochloric or oxalic acid, but basic catalysts also can be used. In some instances, catalysts are not necessary. Examples of alkaline catalysts include ammonia, amines and quaternary ammonium bases. Wetting agents of the anionic type such as sodium alkyl aryl sulfonate, can be used to speed up the reaction when weak acids are used.

In instances where a resole is prepared, more than one mole of formaldehyde per mole of phenol (or oxyalkylated phenol) is useful. The specific phenols and aldehydes or ketones which can be used are described above, and the alkaline catalysts described above also are useful. The resoles have carbinol groups, as well as phenolic hydroxyl groups, which can be reacted with the reagents to be discussed hereinafter.

In accordance with the present invention, improved condensation products can be prepared which preferably contain substantially no free reactive phenolic groups, i.e., less than about 5 percent, but preferably less than about 0.5 percent of the phenolic hydroxyl present originally in the phenol-aldehyde or phenol-ketone condensate.

Preferred method of hydroxyalkylation is by reaction with compounds containing a mono oxirane ring. Monomeric epoxides having two to eighteen carbon atoms are preferred. Examples of mono-epoxides that can be employed are ethylene oxide, propylene oxide, butylene oxide, cyclohexane oxide, 2,3-epoxyhexane, epichlorohydrin, styrene oxide, allyl glycidyl ether, methyl glycidyl ether, butyl glycidyl sulfide, glycidyl methyl sulfone, glycidyl methacrylate, glycidyl allyl phthalate, and the like. The preferred mono-epoxides are the mono-epoxide substituted hydrocarbons, the mono-epoxy-substituted ethers, sulfides, sulfones and esters wherein the said compounds contain two to eighteen carbon atoms. Minor amounts of di-epoxides can also be incorporated into the compositions. Typical di-epoxides are 3,4-epoxy-6-methylcyclohexylmethyl - 3,4 - epoxy - 6-methylcyclohexanecarboxylate, dicyclopentadiene dioxide, limonene dioxide, 4,4'(diglycidyl) diphenylpropane, vinylcyclohexane dioxide. Many other epoxides can be used, but the alkylene oxides containing two to six carbon atoms are generally used. Mixtures of the foregoing compounds are very useful.

Catalysts for the reaction of the oxirane ring compounds and phenolic hydroxyl groups are alkali or alkaline earth hydroxides, primary amines, secondary amines, tertiary amines, or basic alkali salts. These include sodium, potassium, lithium, calcium and barium hydroxides, amines such as methyl, dimethyl, diethyl, trimethyl, triethyl, tripropyl, dimethyl benzyl, dimethyl hydroxyethyl, dimethyl-2-hydroxypropyl and the like, and salts of strong bases and weak acids such as sodium acetate or benzoate. Combinations of catalysts can be used to excellent advantage in obtaining particular products. For example, an amine catalyst, such as triethyl amine can be used to add a mole of propylene oxide to each phenolic hydroxyl groups, and thereafter hydroxyalkylation can be continued with ethylene oxide using as catalyst an alkali metal hydroxide, such as sodium hydroxide. In general, the hydroxyalkylation reaction can be carried out at 50 to 250 degrees centigrade. The hydroxyalkylation of the phenols is preferably performed at 50 to 150 degrees; the hydroxyalkylation of the phenolic condensates proceeds at better rates at 150 to 250 degrees. Solvents are not normally preferred, although solvents can be used for the higher molecular weight resins to reudce viscosity.

The phenolic hydroxyl of the phenols or the phenolic condensates can also be hydroxyalkylated by reacting alkylene halohydrins with the phenolic hydroxyl using equivalent amounts of an alkali metal hydroxide to bring about reaction. Suitable alkylene halohydrins are ethylene chloro- or bromohydrins, propylene chloro- or bromohydrins, 2,3-butylene chloro- or bromohydrins, glyceryl chloro- or bromohydrins.

Another method for hydroxyalkylating novolacs is by reaction with alkylene carbonates such as ethylene carbonate and propylene carbonate, using a catalyst such as sodium or potassium carbonate.

In the preparation of the phenol-aldehyde or phenol-ketone condensation product, there should be at least one hydroxyl-alkyl group per phenol-aldehyde or phenol-ketone molecule. It is preferred that there be at least about one mole of hydroxyalkylation agent per mole of phenolic hydroxyl. However, products prepared by reaction with a number of units of hydroxyalkylation agent per mole of phenolic hydroxyl are often desired, since the physical properties of polyurethane compositions containing them can be adjusted by controlling the ether chain length. Also the hydroxyl number of the modified phenol-aldehyde condensate can be adjusted by controlling the ether chain length. The length of the ether chain also influences the viscosity of the condensation product, as well as the physical properties of the moldable sand compositions ultimately prepared reacting the resin component with an organic polyisocyanate. Generally, it is not desired to react more than 10 moles of the hydroxyalkylation agent per mole of phenolic hydroxyl group. However, up to 25 units of hydroxyalkylation agent per mole of phenolic hydroxyl group can be employed if desired.

In addition to the foregoing resin component (A), the compositions of the invention preferably also include (B) a resinous product which results from the carbonization of pine wood. Such products are pine tars that are characterized as distilled, resinous products of the carbonization of pine wood having an initial boiling point of at least 150 degrees centigrade, a viscosity of at least 100 centipoises at 30 degrees centigrade, and an acid number of at least 20. Suitable pine tars are generally viscous liquid products of which about 60 to 90 percent boil below about 350 degrees centigrade. The viscosity is more usually at least 300 centipoises at 30 degrees centigrade, and the acid number is more usually in the range of about 30 to about 80. Such pine tars can be produced by the destructive distillation of pine wood whereby the pine wood is carbonized with the aid of heat and the vaporized products are recovered by condensation. Another suitable method for producing such pine tars involves carbonizing the pine wood and extracting the products to provide a water soluble fraction and a solvent soluble fraction, followed by distilling the solvent soluble fraction to recover the high boiling pine tar In the preparation of the resinous component that is suitable for reaction with an organic polyisocyanate to produce the polyurethane resin binder, the resin component (A), together with the resinous component (B), is mixed with a suitable solvent for the mixture. Suitable solvents include the aromatic hydrocarbons of 6 to 10 carbon atoms such as benzene, toluene, xylene, ethylbenzene, diethylbenzene, mono-chlorobenzene, and the like. Other suitable solvents include the monoester-monoethers of alkylene glycols of 2 to 10 carbon atoms such as diethylene glycol (Carbitol), ethylene glycol (Cellosolve), propylene glycol, butylene glycol, and the like. Typical solvents of the foregoing class include Cellosolve acetate (monomethylether ethylene glycol acetate), methyl Cellosolve acetate, butyl Cellosolve acetate (monobutylether ethylene glycol acetate), Carbitol acetate (monoethylether diethyelne glycol acetate), butyl Carbitol (monobutylether diethylene glycol acetate) acetate and mixtures thereof. Mixtures of the foregoing classes of solvents can be employed. Auxiliary solvents can be admixed with the foregoing classes of solvents, for example, aliphatic hydrocarbons, such as hexane, octane, mineral spirits, petroleum, naphtha, and the like. The resinous components are mixed with the solvent until a uniform, homogeneous mixture is formed. The mixing time is generally in the range of 0.5 to 3 hours, preferably in the range of 1 to 2 hours. The solvnet is generally employed in a ratio of about 20 to about 60 parts by weight per 100 parts of resinous component, preferably in the range from about 25 to about 50 parts by weight of solvent per 100 parts of resinous component. Resin component (B) can be employed in a ratio up to about 10 parts by weight of resin component (B) per part of resin component (A), preferably in the ratio of about 0.1 to about 5 parts by weight of resin component (B) per part of resin component (A). The resin component-solvent composition generally has a viscosity in the range of about 20 to 100 centipoises at 30 degrees centigrade and a reactivity number in the range from about 80 to 160.

Various organic polyisocyanates can be used in preparing the compositions of the invention. Among these isocyanates are 2,4-tolylene diisocyanate, 2,6-tolylene diisocyanate, and mixtures thereof, and particularly the crude mixtures thereof that are commercially available. Other typical polyisocyanates include methylene-bis-(4-phenyl isocyanate), n-hexyl diisocyanate, 1,5-naphthalene diisocyanate, 1,3-cyclopentylene diisocyanate, p-phenylene diisocyanate, 2,4,6-tolylene triisocyanate, 4,4',4''-triphenylmethane triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following generalized formula:

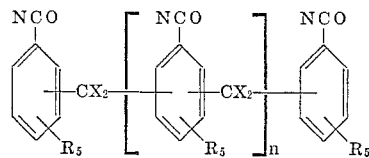

wherein $R_5$ is selected from the group consisting of hydrogen, chlorine, bromine, alkyl having 1 to 5 carbon atoms, and alkoxy having 1 to 5 carbon atoms;

X is selected from the group consisting of hydrogen, alkyl having 1 to 10 carbon atoms and phenyl; and $n$ has an average value of at least 1 and generally about 1 to 3.

A preferred example is polymethylene polyphenylisocyanate.

In some cases, it is desired to blend the resin components (A) and (B) with one or more additional hydroxyl-containing polymeric materials to obtain a further variation in properties. However, the components (A) and (B) should comprise at least 50 weight percent of the total hydroxyl-containing components. Such auxiliary hydroxyl-containing polymeric materials can include polyesters, polyethers and mixtures thereof. The polyesters are the reaction products of a polyhydric alcohol and a polycarboxylic compound, said polycarboxylic compound being either an acid, an anhydride, an acid ester or an acid halide. The polyethers are the reaction products of either a polyhydric alcohol or a polycarboxylic acid with a monomeric 1,2-epoxide having a single 1,2-epoxy group.

The following resin formulations are typical hydroxyl-containing polymeric materials that can be used as auxiliary components in the polyurethane compositions of this invention:

RESIN A 6 moles 1,4,5,6,7,7-hexachlorobicyclo-(2.2.1)-5-heptene-2,3-dicarboxylic acid
12 moles trimethylolpropane
Acid No.: less than 10
Hydroxyl No.: 365

RESIN B 6 moles adipic acid
10 moles trimethylolpropane
Acid No.: less than 1
Hydroxyl No.: 504

RESIN C
Polypropylene glycol
Molecular weight: about 2000

RESIN D
4 moles 1,4,5,6,7,7-hexachlorobicyclo-(2.2.1)-5-heptene 2,3-dicarboxylic acid
7.6 moles glycerol
2 moles adipic acid
Acid No.: 5
Hydroxyl No.: 265

RESIN E
3 moles adipic acid
5 moles glycerol
Acid No.: 1
Hydroxyl No.: 640

RESIN F
1 mole trimethylolpropane
6 moles propylene oxide
Hydroxyl No.: 392

RESIN G
8.8 moles trimethylolpropane
5 moles adipic acid
1 mole phthalic anhydride
Acid No.: less than 1
Hydroxyl No.: 435

RESIN H
1 mole 1,4,5,6,7,7-hexachlorobicyclo-(2.2.1)-5-heptene-2,3-dicarboxylic acid
4 moles propylene oxide
Acid No.: 0
Hydroxyl No.: 202

Highly useful compositions are also produced by introducing a polyhydric alcohol to the reaction mixture during the preparation of the modified phenol-aldehyde compositions of the invention. The addition of the polyhydric alcohol is preferably made following the preparation of the base phenol-aldehyde or phenol-ketone condensate and prior to the introduction of the oxyalkylation agent. Suitable polyhydric alcohols include glycerol, sorbitol, mannitol, pentaerythritol, trimethylol propane, trimethylol ethane, and the like.

In preparing the polyurethane compositions of the invention, the components are preferably reacted in a ratio sufficient to provide about 100 percent of isocyanato groups with respect to the total number of hydroxyl, carboxyl and equivalent groups present in all of the hydroxyl-containing components. By equivalent groups are meant carboxylic anhydride, carboxylic acid halide, amino and other groups that are reactive with isocyanato groups. The ratio of components is generally sufficient to provide about 100 to 115 percent of isocyanato groups, so that there is sufficient isocyanate to react with the small quantities of water that may be in contact with the reacting components.

In the preparation of the moldable sand compositions of the invention, foundry sand is placed in a conventional muller or other suitable mixer. The resinous components and solvent are introduced to the sand and mixed for 1 to 10 minutes, preferably about 1 to 5 minutes. The sand grains are thereby coated with the resinous components. Thereafter, the polyisocyanate component is introduced to the mixture of sand, solvent and resin components, and mixing is continued for about 1 to 5 minutes, preferably about 2 to 3 minutes. A portion of the solvent generally evaporates in the muller. The resulting moldable composition is then discharged from the mixing device and introduced into a suitable mold of the desired shape.

In an alternative mixing process, an apparatus known as a "slinger" can be employed. The apparatus comprises two screw conveyors which converge at a common point to discharge the contents of each conveyor into a single screw conveyor for a final mixing operation. In the operation of the process of the invention in such an apparatus, a portion of the foundry sand and the resin components are introduced into one of the two feed screw conveyors. The polyisocyanate component and the remainder of the foundry sand is introduced into the second of the feed screw conveyors. The two screw conveyors discharge the sand coated with the respective components into the common screw conveyor where all of the reacting components are intimately mixed with the total charge of foundry sand. The resulting moldable composition is discharged into a suitable mold of the desired shape.

In the preparation of the moldable compositions of the invention, the polyurethane component, the reaction product of the resin components and the organic polyisocyanate, is employed in a proportion sufficient to provide about one to 5 weight percent of polyurethane component based on the weight of the foundry sand. The proportion is preferably in the range of about 1 to 2.5 weight percent.

The moldable sand compositions of the invention are useful in the preparation of found sand cores and foundry sand moles. These products are readily produced by permitting the moldable composition to cure at room temperature, i.e., about 30 degrees centigrade. However, higher and lower curing temperatures can be employed, if desired, from about 10 to about 100 degrees centigrade or higher.

The following examples illustrate the various aspects of the invention but are not intended to limit it. Where not otherwise specified, temperatures are given in degrees centigrade, parts are by weight, and viscosities are given in Gardner seconds at 50 degrees centigrade.

EXAMPLE 1

A typical modified phenol-aldehyde condensation product prepared by introducing 3,000 parts phenol, 13 parts of oxalic acid catalyst and 6 parts of a wetting agent into a jacketed reactor and heating to 100 degrees centigrade. The anionic wetting agents of alkyl aryl sulfonate type are preferred. 1,110 parts of a 37 percent aqueous formaldehyde solution are added to the reactor at such a rate that the heat of reaction provide a vigorous reflux. Refluxing is continued for two hours after the completion of the formalin addition. The reactor contents are dehydrated at 180 degrees centigrade and then dephenolated at 200 degrees centigrade at 50 millimeters vacuum. Approximately 2,030 parts of phenol-aldehyde condensate are produced. 7.2 parts of sodium hydroxide are introduced to the reactor. Ethylene oxide is then added to the reactor as either a vapor or a liquid. The reactor temperature is maintained at 190 degrees centigrade for the initial two hours and is then permitted to increase to the range of 200 to 220 degrees centigrade until the addition of 878 parts of ethylene oxide is complete. The resulting condensation product has a hydroxyl number of 370, and a Gardner viscosity at 50 degrees centigrade of about 2,000 seconds.

EXAMPLE 2

A typical modified phenol-ketone condensation product is prepared in a manner similar to the method of Example 1 by reacting 3,000 parts phenol, 820 parts acetone under refluxing conditions for four hours in the presence of ten parts of sulfuric acid catalyst and ten parts of alkyl benzene sulfonate wetting agent. After dehydration and dephenolation in the manner of Example 1, ten parts of sodium hydroxide are introduced to the phenol-acetone condensate. Then 900 parts of ethylene oxide are introduced to the reaction mixture which is maintained at 180 to 220 degrees centigrade. The resulting condensation product has a hydroxyl number of 310.

The characteristics of the compositions of Examples 1 and 2 can be drastically changed by varying the ratio of ethylene oxide to phenolic hydroxyl groups, and also by varying the ratio of phenol to aldehyde or ketone in the base condensate. In Examples 3 through 6, the ratio of ethylene oxide to phenolic hydroxyl group was varied from 1.50 to 3.0, while maintaining a ratio of phenol to aldehyde in the base condensate of three to two. In Examples 7 through 9, the phenol to aldehyde ratio was changed to five to four and the ethylene oxide ratio was varied from 1.25 to 1.72. The effects on viscosity, as well as hydroxyl number, of the resulting addition products are shown in Table I.

All other conditions in Examples 3 to 9 are the same as those in Example 1.

TABLE I

| Example No. | Ratio of phenol to aldehyde in base condensate | Ratio of ethylene oxide to hydroxyl group | Hydroxyl No. | Viscosity |
|---|---|---|---|---|
| 1 | 3/2 | 1.0 | 376 | 2,000 |
| 3 | 3/2 | 1.50 | 339 | 335 |
| 4 | 3/2 | 2.0 | 301 | 52 |
| 5 | 3/2 | 2.5 | 267 | 23 |
| 6 | 3/2 | 3.0 | 250 | 13.7 |
| 7 | 5/4 | 1.25 | 340 | 19,500 |
| 8 | 5/4 | 1.50 | 320 | 2,200 |
| 9 | 5/4 | 1.72 | 292 | 545 |

The viscosities and hydroxyl numbers of the condensation products can also be varied by changing the type of alkylene oxide employed while holding both the chain length of the base condensate, as well as of the length of the alkylene oxide side chains constant. In Examples 10, 11 and 12, the method of preparation of Example 5 is repeated except that a portion or all of the ethylene oxide is replaced with propylene oxide. The hydroxyl numbers and viscosities of the resulting addition products are shown in Table II where these values are compared with those obtained in Example 5. Also shown in Example 14 in Table II are the properties of resin prepared as in previous examples, but with different ratios of phenol, formaldehyde and alkylene oxides.

TABLE II

| Example No. | Ratio of phenol to aldehyde in base condensate | Ratio of alkylene oxide to hydroxyl group | Hydroxyl No. | Viscosity |
|---|---|---|---|---|
| 5 | 3/2 | 2.5 ethylene oxide | 267 | 23 |
| 10 | 3/2 | 2.0 ethylene oxide+0.5 propylene oxide. | 256 | 21 |
| 11 | 3/2 | 1.73 ethylene oxide+0.76 propylene oxide. | 257 | 19 |
| 12 | 3/2 | 2.5 propylene oxide | 244 | 31 |
| 13 | 4/3 | 3.5 ethylene oxide, 3.5 propylene oxide. | 200 | (1) |

[1] 2,500 centipoises at 30 degrees centigrade.

The following examples illustrate the preparation of additional modified phenol-aldehyde compositions in accordance with this invention.

EXAMPLE 14

This example illustrates the use of an alkylene halohydrin.

Into a five liter three-necked flask are charged 520 grams of a phenol-aldehyde condensate prepared as described in Example 1 and 600 grams of ethyl alcohol. To the mixture is added 880 grams of a 37 percent sodium hydroxide solution. The solution is heated to 80 degrees centigrade and 443 grams of ethylene chlorohydrin are added over a period of one hour. The reaction is refluxed until free of phenolic hydroxyl, the alcohol is distilled off and the product is washed with hot water until free of salt. The residue is dried by heating to 150 degrees centigrade under vacuum.

EXAMPLE 15

312 grams of the phenol aldehyde condensate prepared in Example 1, 267 grams of ethylene carbonate and 1.5 grams of potassium carbonate are mixed together and heated to 170 to 180 degrees centigrade under a stream of $N_2$. Carbon dioxide is evolved. After six hours, the product is free of phenolic hydroxyl and has a hydroxyl number of 357.

EXAMPLE 16

312 grams of the phenol-aldehyde condensate prepared in Example 1, 290 grams of propylene carbonate and 1.5 grams of potassium carbonate are mixed together and heated to 170 to 180 degrees centigrade under a stream of $N_2$ for 12 hours. Carbon dioxide is evolved. The product is free of phenolic hydroxyl and has a hydroxyl number of 338.

The following examples illustrate the method of preparing the condensation products of the invention by condensing an oxyalkylated phenol with an aldehyde.

EXAMPLE 17

One mole of phenol is reacted with two moles of ethylene oxide, and thereafter 364 parts by weight of the hydroxyethylated product are mixed with 20 parts of a 37 percent aqueous formaldehyde solution, and 4.3 parts of concentrated hydrochloric acid solution. The reactants are refluxed until the residual carbonyl concentration is reduced to zero. The reaction product is stripped at 180 degrees centigrade and under full vacuum. The resulting product (341 parts) has a hydroxyl number of 253.

The following example illustrates a hydroxyalkylated methylol phenolic resin for use in the invention.

EXAMPLE 18

Forty parts of sodium hydroxide are dissolved in 470 parts of water. To the solution are added 116 parts of propylene oxide and 263 parts of a phenol-aldehyde condensate prepared by reacting one mole of phenol and three moles of formaldehyde and dehydrating to about 70 percent solids. The mixture is reacted for 16 hours at 40 degrees centigrade and is essentially free of propylene oxide. The sodium hydroxide is neutralized with 60 parts of acetic acid and the water is removed by azeotropic distillation with benzene at reduced pressure. The sodium acetate is allowed to precipitate from the resin-benzene mixture and is thus essentially removed. The benzene is removed by drying under vacuum. The hydroxyalkylated phenol-aldehyde condensation product is a viscous semisolid product.

EXAMPLE 19

35 parts by weight of the oxyalkylated novolac resin of Example 5, 45 parts by weight of a pine tar product made by the destructive distillation of pine wood and having an initial boiling point of 150 degrees centigrade, a viscosity of 700 centipoise at 30 degrees centigrade and an acid number of 56, were mixed with 10 parts by weight of xylene, 10 parts of Cellosolve acetate and 1.5 parts by weight of triethylamine. The resulting mixture was added to 6667 parts by weight of foundry sand in a conventional muller for 2 minutes. Thereafter, polymethylene polyphenylisocyanate was added to the resin on the sand in an amount sufficient to provide 1.1 isocyanato groups per hydroxyl group in the resin, and mixing was continued for 2 minutes. Thereafter, the resulting mixture was discharged from the muller. The resin-sand mixture was also tested for "deep-set time" immediately following discharge from the muller. In this test a portion of resin-sand mixture is discharged into a pail. A thermometer is inserted into the resin mixture, and the time at which the thermometer can no longer be pushed deeper into the resin-sand mixture is observed. For the material prepared in this example, the deep-set time was 10 minutes.

Molded articles were prepared 1 minute after the resin-sand mixture was discharged from the muller, and cured at ambient temperature, i.e., about 30 degrees centigrade for 24 hours. At the end of the 24 hour curing time, the molded articles were tested and found to have a tensile strength in the range of 155 to 197 pounds per square inch and a scratch hardness of 90 to 95. The scratch hardness test was conducted as described in The Foundry Sand Handbook, 7th Edition, American Foundry Society Publication #12, using a Dietert No. 373 Tester. A scratch hardness value of 75 is acceptable to the foundry industry.

EXAMPLE 20

35 parts by weight of the oxyalkylated novolac resin of Example 5 and 45 parts by weight of the pine tar product used in Example 19 were mixed with 10 parts by weight of xylene, 10 parts by weight of Cellosolve acetate and 4 parts by weight of cobalt naphthenate. The resulting mixture was blended with 6667 parts by weight of foundry sand in a muller and mixed for 2 minutes. Thereafter, sufficient polymethylene polyphenylisocyanate was added to the resin-sand mixture in the muller to provide 90 percent of isocyanato groups with respect to the total number of hydroxyl groups present in the resin components, and mixing was continued for 2 minutes. The resulting resin-sand mixture was discharged from the muller and immediately employed to form molded articles. The molded products were cured at ambient temperature for 24 hours and was then observed to have a tensile strength in the range of 107 to 122 pounds per square inch and a scratch hardness of 75 to 80. The deep-set time for the resin-sand mixture was 20 minutes.

EXAMPLE 21

30 parts by weight of the oxyalkylated novolac resin of Example 5 and 50 parts by weight of the pine tar product used in Example 19 were mixed with 10 parts by weight of xylene and 10 parts by weight of Cellosolve acetate for 2 hours. The resulting mixture had a pH of 4.9 and a viscosity of 148 centipoise at 25 degrees centigrade. The mixture was blended with 6667 parts by weight of foundry sand in a muller for 2 minutes. Thereafter, sufficient polymethylene polyphenylisocyanate was added to the resin-sand mixture in the muller to provide 110 percent of isocyanato groups with respect to the total number of hydroxyl groups in the resin components. Mixing was continued for 2 minutes and the resulting resin-sand mixture was discharged from the muller. Molded articles were prepared 0, 5 and 10 minutes after the resin-sand mixture was discharged. These articles were cured at ambient temperature or about 30 degrees centigrade for 24 hours and determined to have tensile strengths as follows:

| Time article molded after discharged from muller | Tensile strength, pounds per square inch |
|---|---|
| 0 | 260–280 |
| 5 | 255–262 |
| 10 | 232–243 |

The scratch hardness was 90–95, and the deep-set time was 60 minutes.

EXAMPLE 22

10 parts by weight of the oxyalkylated novolac resin of Example 5, 50 parts by weight of the pine tar product used in Example 19 and 10 parts by weight of a polyester resin prepared by reacting 2 moles of trimethylol propane per mole of chlorendic anhydride and reducing the acid number to 25, were mixed with 20 parts by weight of xylene and 10 parts by weight of Cellosolve acetate for 2 hours at 80 degrees centigrade. The resulting mixture was blended with 6667 parts by weight of foundry sand in a muller and mixed for 2 minutes. Thereafter, sufficient polymethylene polyphenylisocyanate was added to the muller to provide 110 percent of isocyanato groups per the hydroxyl groups of the resin components and mixing was continued for 2 minutes. The resulting resin-sand mixture was discharged from the muller and found to have a deep-set time of 1.5 hours. Articles were molded from the resin-sand mixture at intervals of time following discharge of mixture from the muller. The articles were cured at ambient temperature or about 30 degrees centigrade for 24 hours, and the tensile strength of the cured articles was found to be as follows:

| The article molded after discharged from muller | Tensile strength, pounds per square inch |
|---|---|
| 0 | 295–332 |
| 5 | 274–277 |
| 10 | 257–267 |
| 20 | 215–250 |
| 30 | 212–232 |

The scratch hardness was found to be 95.

EXAMPLE 23

An oxyalkylated novolac resin having an average of 4 phenol radicals per 3 methylene groups and prepared as in Example 13, was blended with the pine tar product used in Example 19, xylene and Cellosolve acetate at various proportions to produce 3 resin-solvent mixtures. The resulting mixtures were added to 6667 parts by weight of foundry sand in a muller and mixed for 2 minutes. Thereafter, sufficient polymethylene polyphenylisocyanate was added to the resin-sand mixtures in sufficient proportion to provide 110 percent of isocyanato groups for the total number of hydroxyl groups in the resin and mixed for 2 minutes. The resin-sand mixtures were discharged from the muller and tested for deep-set time. Articles of the resin-sand mixtures were prepared at various time intervals following discharge of the resin-sand mixtures from the muller. These articles were cured for 24 hours at ambient temperature or about 30 degrees centigrade and then tested for tensile strength. The scratch hardness was also determined. Proportions of components and properties of the resulting products are shown in Table III.

TABLE III.—PARTS BY WEIGHT

|  | A | B | C |
|---|---|---|---|
| Oxyalkylated Novolac | 37 | 30 | 20 |
| Pine tar | 33 | 40 | 50 |
| Xylene | 20 | 20 | 20 |
| Cellosolve acetate | 10 | 10 | 10 |
| Deep set time, hours | 1.08 | 1.17 | 1.5 |

| Time article molded after Discharge from muller | Tensile strength, p.s.i. | | |
|---|---|---|---|
| 5 | 265–280 | 265–272 | 267–242 |
| 10 | 262–250 | 255–277 | 255–230 |
| 15 | 255–242 | 220–217 | 232–235 |
| 20 | 217–202 | 200–235 | 225–240 |
| 30 | 182–160 | 170–150 | 195–215 |
| Scratch hardness | 95 | 90–95 | 95 |

EXAMPLE 24

50 parts by weight of the oxyalkylated novolac resin of Example 13, having an average of 4 phenyl radicals per 3 methylene groups and 7 alkylene oxide units per phenolic hydroxyl group; 10 parts by weight of the polyester resin utilized in Example 22; and 10 parts by weight of a pine tar product made by carbonizing pine wood, separating the vaporized product by solvent extraction into a water soluble fraction and a solvent soluble fraction, followed by distilling the solvent soluble fraction and recovering the fraction boiling at 170 to 350 degrees centigrade, having a viscosity of 540 centipoises at 30 degrees centigrade and an acid number of 43; were mixed with 20 parts by weight of high flash point naphtha and 10 parts by weight of methyl Cellosolve acetate. The resulting mixture was added to 6667 parts of foundry sand in a conventional muller for 2 minutes. Thereafter, 35.4 parts by weight of polymethylene polyphenylisocyanate was added to the resin on the sand, and mixing was continued for 2 minutes. Thereafter, the resulting mixture was discharged from the muller. The deep set time was determined to be 1.5 hours. Articles were molded from the resin-sand mixture at intervals of time following discharge of the mixture from the muller. The articles were cured at ambient temperature (30 degrees centigrade)

for 24 hours, and the tensile strength of the cured articles was found to be as follows:

| Time article molded after discharge from muller | Tensile strength, pounds per square inch |
|---|---|
| 5 | 241 |
| 10 | 230 |
| 20 | 195 |
| 30 | 173 |

The scratch hardness was 95.

In the foregoing examples, Manley 515 foundry sand was employed. This is a round grain sand having an American Foundry Society Number of 68 and a screen analysis as follows:

| U.S. sieve screen size, mesh | Weight percent |
|---|---|
| 40 | 2.7 |
| 50 | 14.8 |
| 70 | 30.0 |
| 100 | 32.0 |
| 140 | 15.8 |
| 200 | 3.7 |
| 270 | 0.8 |
| Through 270 | 0.2 |

The reaction of the resinous components with the organic polyisocyanates to produce the polyurethane products of the invention can be catalyzed by the use of suitable catalysts, if desired. The catalysts employed can be any of the known conventional catalysts for isocyanate reactions, such as the tertiary amines. Many such compounds are useful in the reaction, but they generally have up to 20 carbon atoms. Typical compounds of the trialkyl amines, such as trimethylamine, triethylamine, diethylene triamine, tetramethyl butane diamine and the like. Also suitable are the morpholine compounds such as N-methyl morpholine, N-acetyl morpholine, 4,4′-dithio morpholine, and the like, and the tertiary amine compounds have other functional groups such as diethyl ethanolamine, methyl diethanolamine, N-diethyl aminoacetic acid, methyl-aminodipropionic acid, N-methyl dipropylene triamine, dimethyl pyperazine, and the like. The preferred amine compounds are triethylamine and tetramethyl guanidine. Other urethane catalysts are also useful, for example, the antimony compounds, such as antimony caprylate, antimony naphthenate, and antimonous chloride; the tin compounds such as dibutyltin dilaurate, tri-n-octyltin oxide, hexabutylditin, tributyltin phosphate or stannic chloride.

While this invention has been described with reference to certain specific embodiments, it will be recognized by those skilled in the art that many variations are possible without departing from the scope and spirit of the invention.

We claim:
1. A composition comprising
 (A) a component having the formula:

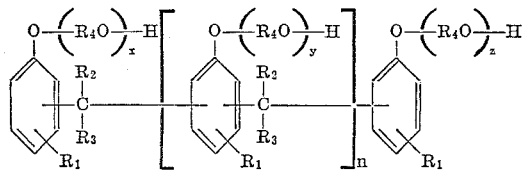

wherein
 $n$ has an average value of about 0.2 to 6,
 $x$, $y$ and $z$ are integers from 1 to 25;
 $R_1$ is independently selected from the group consisting of hydrogen, fluorine, chlorine, bromine, and a hydrocarbon radical;
 $R_2$ and $R_3$ are independently selected from the group consisting of hydrogen, a hydrocarbon radical, and a halogen-substituted hydrocarbon radical; and
 $R_4$ is a hydrocarbon radical, (B) a distilled, resinous product of the carbonization of pine wood having an initial boiling point of at least 150 degrees centigrade, a viscosity of at least 100 centipoises at 30 degrees centigrade and an acid number of at least 20; and
(C) a solvent comprising at least one member of the group of aromatic hydrocarbons, monoester-monoethers of alkylene glycols and aliphatic hydrocarbons.

2. The composition of claim 1 wherein $R_1$, $R_2$ and $R_3$ are hydrogen.
3. The composition of claim 2 wherein is xylene.
4. The composition of claim 2 wherein the solvent is a mixture of xylene and monoethyl ether ethylene glycol acetate.
5. A polyurethane composition comprising the reaction product of components comprising
 (A) a component having the formula:

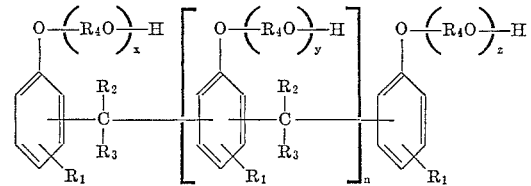

wherein
 $n$ has an average value of about 0.2 to 6,
 $x$, $y$ and $z$ are integers from 1 to 25;
 $R_1$ is independently selected from the group consisting of hydrogen, fluorine, chlorine, bromine, and a hydrocarbon radical;
 $R_2$ and $R_3$ are independently selected from the group consisting of hydrogen, a hydrocarbon radical, and a halogen-substituted hydrocarbon radical; and
 $R_4$ is a hydrocarbon radical,
(B) a distilled, resinous product of the carbonization of pine wood having an initial boiling point of at least 150 degrees centigrade, a viscosity of at least 100 centipoises at 30 degrees centigrade and an acid number of at least 20; and
(C) an organic polyisocyanate.

6. The polyurethane composition of claim 5 wherein $R_1$, $R_2$ and $R_3$ are hydrogen.
7. The polyurethane composition of claim 6 wherein the organic polyisocyanate is a polyaryl polyisocyanate.
8. The polyurethane composition of claim 7 wherein the isocyanate is polymethylene polyphenylisocyanate.
9. The composition of claim 2 wherein $x$, $y$ and $z$ are integers from 1 to 10.
10. The polyurethane composition of claim 6 wherein $x$, $y$ and $z$ are integers from 1 to 10.
11. A process for bonding discrete solid particles which comprises admixing said particles with a component having the formula:

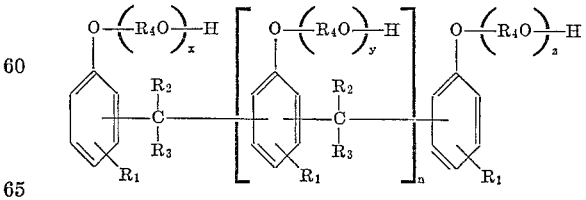

wherein
 $n$ has an average value of about 0.2 to 6,
 $x$, $y$ and $z$ are integers from 1 to 25;
 $R_1$ is independently selected from the group consisting of hydrogen, fluorine, chlorine, bromine, and a hydrocarbon radical;
 $R_2$ and $R_3$ are independently selected from the group consisting of hydrogen, a hydrocarbon radical, and a halogen-substituted hydrocarbon radical; and
 $R_4$ is a hydrocarbon radical, a distilled, resinous product of the carbonization of pine wood having an initial boiling point of at least 150 degrees centigrade, a viscosity of at least 100 centipoises at 30 degrees centigrade and an acid number of at least 20; a solvent comprising at least one member of the group of aromatic hydrocarbons, monoester-monoethers of alkylene glycols and aliphatic hydrocarbons, and an organic polyisocyanate;

continuing the mixing of the resulting mixture to coat said particles with the other components; and curing the resulting moldable composition to produce a shaped article.

12. A process for preparing foundry cores which comprises admixing foundry sand particles, a component having the formula:

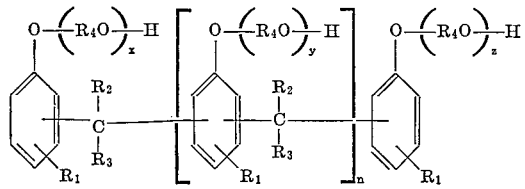

wherein $n$ has an average value of about 0.2 to 6, $x, y$ and $z$ are integers from 1 to 25;

$R_1$ is independently selected from the group consisting of hydrogen, fluorine, chlorine, bromine, and a hydrocarbon radical;

$R_2$ and $R_3$ are independently selected from the group consisting of hydrogen, a hydrocarbon radical, and a halogen-substituted hydrocarbon radical; and $R_4$ is a hydrocarbon radical, a distilled, resinous product of the carbonization of pine wood having an initial boiling point of at least 150 degrees centigrade, a viscosity of at least 100 centipoises at 30 degrees centigrade and an acid number of at least 20; and a solvent comprising at least one member of the group of aromatic hydrocarbons, monoester-monoethers of alkylene glycols and aliphatic hydrocarbons to form a wet mixture;

adding an organic polyisocyanate to said wet mixture and continuing the mixing to coat said foundry sand particles with the other components of the mixture; and curing the resulting moldable composition to form a molded article.

13. The process of claim 12 wherein the $R_1$, $R_2$ and $R_3$ are hydrogen.

14. The process of claim 13 wherein the organic polyisocyanate is polymethylene polyphenylisocyanate.

15. A foundry sand composition comprising foundry sand from about 1 to about 5 percent by weight based on the weight of the sand, of a polyurethane composition comprising the reaction product of components comprising (A) a component having the formula:

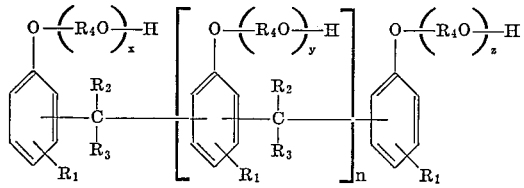

wherein $n$ has an average value of about 0.2 to 6, $x, y$ and $z$ are integers from 1 to 25;

$R_1$ is independently selected from the group consisting of hydrogen, fluorine, chlorine, bromine, and a hydrocarbon radical;

$R_2$ and $R_3$ are independently selected from the group consisting of hydrogen, a hydrocarbon radical, and a halogen-substituted hydrocarbon radical; and $R_4$ is a hydrocarbon radical, (B) a distilled, resinous product of the carbonization of pine wood having an initial boiling point of at least 150 degrees centigrade, a viscosity of at least 100 centipoises at 30 degrees centigrade and an acid number of at least 20; and (C) an organic polyisocyanate.

16. A composition of claim 15 wherein $R_1$, $R_2$ and $R_3$ are hydrocarbon.

17. A composition of claim 16 wherein the organic polyisocyanate is polymethylene polyphenylisocyanate.

18. The composition of claim 1 comprising an additional component (D) a polyester of a polyhydric alcohol and a polycarboxylic compound.

19. The composition of claim 18 wherein the polycarboxylic compound is chlorendic anhydride.

20. The polyurethane composition of claim 5 wherein the reaction product also comprises the component (D) a polyester of a polyhydric alcohol and a polycarboxylic compound.

21. The composition of claim 20 wherein the polycarboxylic compound is chlorendic anhydride.

22. The composition of claim 15 wherein the polyurethane product also comprises the component (D) a polyester of a polyhydric alcohol and a polycarboxylic compound.

23. The composition of claim 22 wherein the polycarboxylic compound is chlorendic anhydride.

24. A composition comprising (A) a component having the formula:

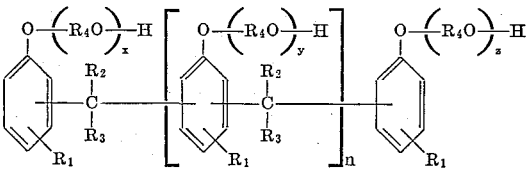

wherein $n$ has an average value of about 0.2 to 6, $x, y$ and $z$ are integers from 1 to 25;

$R_1$ is independently selected from the group consisting of hydrogen, fluorine, chlorine, bromine, and a hydrocarbon radical;

$R_2$ and $R_3$ are independently selected from the group consisting of hydrogen, a hydrocarbon radical, and a halogen-substituted hydrocarbon radical; and $R_4$ is a hydrocarbon radical, and (B) a distilled, resinous product of the carbonization of pine wood having an initial boiling point of at least 150 degrees centigrade, a viscosity of at least 100 centipoises at 30 degrees centigrade and an acid number of at least 20.

References Cited

UNITED STATES PATENTS

| | | | |
|---|---|---|---|
| 3,468,822 | 9/1969 | Wismer et al. | 260—2.5 |
| 2,308,498 | 1/1943 | Earhart et al. | 260—19 |
| 2,391,368 | 12/1945 | Underwood | 260—25 |
| 2,948,694 | 8/1960 | Reed | 260—24 |
| 3,242,230 | 3/1966 | Habib | 260—25 |
| 3,316,140 | 4/1967 | Sonnabend | 161—198 |

DONALD E. CZAJZ, Primary Examiner

W. E. PARKER, Assistant Examiner

U.S. Cl. X.R.

164—43; 260—38; 261—24, 19; 264—225

PO-1050
(5/69)

UNITED STATES PATENT OFFICE
CERTIFICATE OF CORRECTION

Patent No. 3,499,861  Dated March 10, 1970

Inventor(s) Francis M. Kujawa et al.

It is certified that error appears in the above-identified patent and that said Letters Patent are hereby corrected as shown below:

Column 1, lines 61-63, for "$\begin{smallmatrix}R_2\\|\\C\\|\\R_1\end{smallmatrix}$" read -- $\begin{smallmatrix}R_2\\|\\C\\|\\R_3\end{smallmatrix}$ --. Column 4, line 65, for "reudce" read -- reduce --. Column 5, line 45, after "tar" insert a period -- . --; column 5, line 59, for "monomethylether" read -- monoethylether --; column 5, lines 59-60, after "methyl Cellosolve acetate" read -- (monomethylether ethylene glycol acetate) --; column 5, line 62, for "diethyelne" read -- diethylene --; column 5, line 72, for "solvnet" read -- solvent --. Column 8, line 20, for "found" read -- foundry --. Column 16, line 11, for "hydrocarbon" read -- hydrogen --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents